United States Patent [19]

Kulba et al.

[11] 3,990,137

[45] Nov. 9, 1976

[54] PARALLEL ACTION PLIERS

[75] Inventors: Stephen Kulba, Syracuse; Leslie E. Johnson, Fulton, both of N.Y.

[73] Assignee: Scientific Tool & Engineering Co., Liverpool, N.Y.

[22] Filed: Oct. 3, 1975

[21] Appl. No.: 619,379

[52] U.S. Cl. .................................... 29/229; 81/352; 81/302

[51] Int. Cl.$^2$ ..................... B23P 19/04; B25B 27/20

[58] Field of Search ............. 81/352, 353, 302, 5.1; 29/229, 268

[56] References Cited

UNITED STATES PATENTS

| | | | |
|---|---|---|---|
| 2,553,620 | 5/1951 | Yeazell | 81/353 |
| 2,715,345 | 8/1955 | Rozmus | 81/5.1 R |
| 3,390,445 | 7/1968 | Sova, Sr. | 29/229 |
| 3,662,449 | 5/1972 | Hashimoto | 29/229 |

*Primary Examiner*—Al Lawrence Smith
*Assistant Examiner*—Roscoe V. Parker
*Attorney, Agent, or Firm*—Bruns & Jenney

[57] ABSTRACT

Parallel action pliers for the manipulation of snap rings and the like. The jaws of the pliers carry a pair of parallel pins adapted to engage the snap ring, and the parallel relationship continues as the pins are moved away from or toward one another by actuation of the plier handles. The plier jaws are provided with two pairs of parallel bores in which the pins can be selectively mounted, and the pairs of bores are perpendicular to one another to enable the pliers to be either perpendicular or parallel to the plane of the snap ring being manipulated as available space may dictate.

9 Claims, 11 Drawing Figures

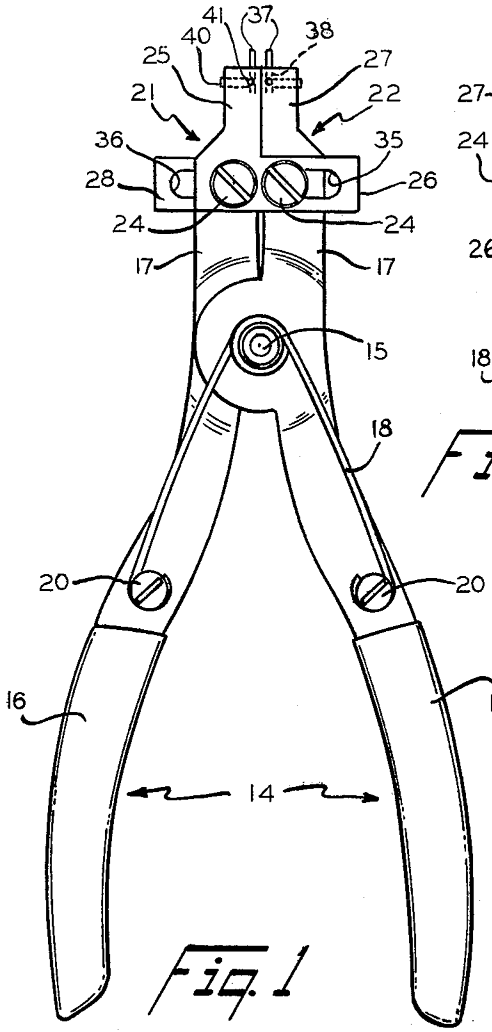
Fig. 1
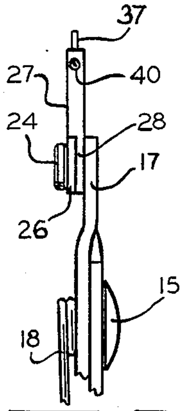
Fig. 2
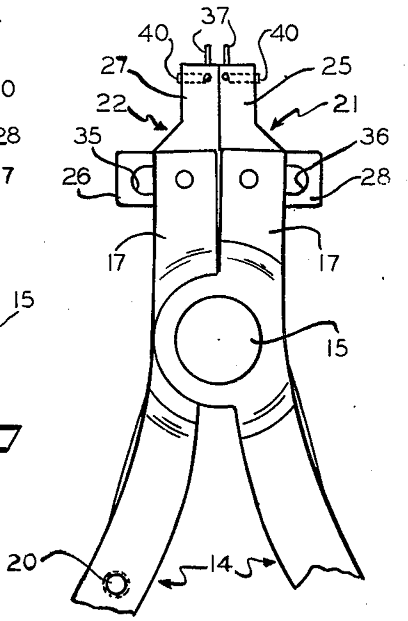
Fig. 3
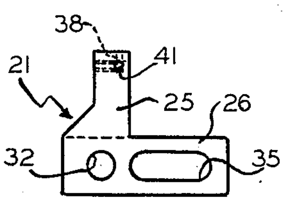
Fig. 4
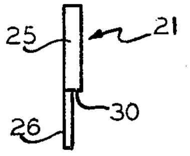
Fig. 5
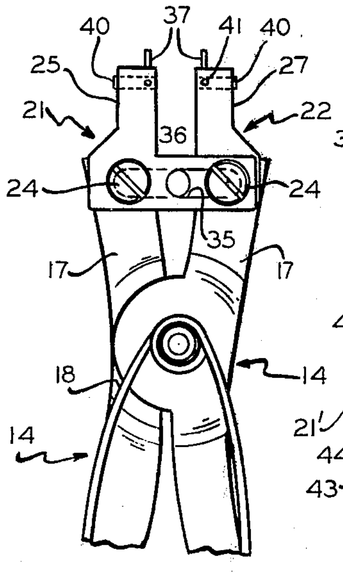
Fig. 8
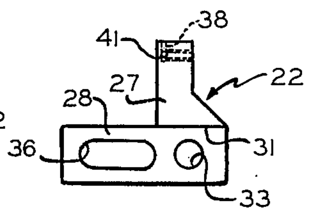
Fig. 6
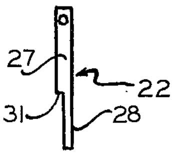
Fig. 7
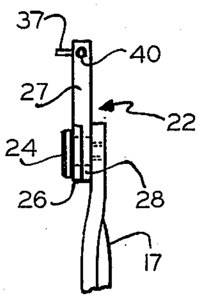
Fig. 10
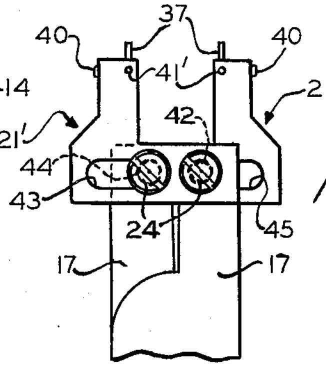
Fig. 9
Fig. 11
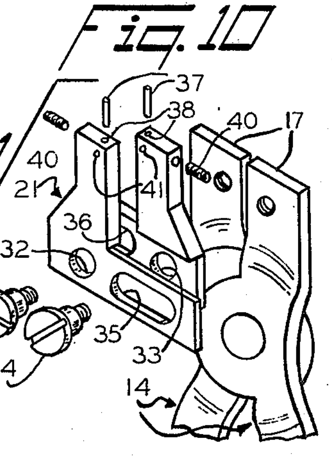

PARALLEL ACTION PLIERS

BACKGROUND OF THE INVENTION

This invention relates generally to hand tools, and has particular reference to an improved and simplified construction for parallel action pliers that are especially adapted for the manipulation of snap rings.

Parallel action pliers are well known in the art, a variety of different constructions having been developed heretofore. Parallel action pliers for the manipulation of snap rings and the like have also been developed but of those known to the applicants, most are relatively complex structurally or of limited utility, or both. In this connection, reference is made to U.S. Pat. Nos. 2,553,620 to W. O. Yeazell and 2,715,345 to W. J. Rozmus which are the closest prior art known to the applicants.

SUMMARY OF THE INVENTION

The present invention is directed to parallel action pliers, particularly adapted for use with snap rings and the like, which are versatile and yet have a simple, efficient construction. The pliers comprise a pair of pivotally connected handle members which carry a pair of coacting jaw members. Each jaw member has a fixed connection with one handle and a pin and slot connection with the other, and the jaw members are arranged so that actuation of the handles causes the jaws to move away from or toward one another while maintaining a parallel relationship.

The plier jaws are provided with a pair of outwardly projecting parallel pins for engagement with the snap ring, and these pins can be mounted in either of two pairs of parallel bores that are perpendicular to one another. This allows the pliers to be either perpendicular or parallel to the plane of the snap ring being manipulated as available space in a machine, for example, may dictate.

In one form of the invention, squeezing the handle grips together operates to move the jaw members apart. In another form, the jaws are moved toward one another when the handle grips are squeezed.

BRIEF DESCRIPTION OF THE DRAWINGS

FIG. 1 is a front elevation of a pair of pliers embodying the invention;

FIG. 2 is a fragmentary right side elevation of the pliers;

FIG. 3 is a fragmentary rear elevation of the pliers;

FIGS. 4 and 5 are front and right side elevations, respectively, of one of the plier jaws;

FIGS. 6 and 7 are front and right side elevations, respectively, of the other plier jaw;

FIG. 8 is a fragmentary front elevation of the pliers with the handle grips squeezed together and the jaws moved apart;

FIG. 9 is a fragmentary front elevation of another form of the invention;

FIG. 10 is a fragmentary right side elevation corresponding to FIG. 2 but showing the snap ring enegaging pins in their alternate location; and FIG. 11 is an exploded view of the upper, jaw portion of the pliers.

DESCRIPTION OF THE PREFERRED EMBODIMENTS

Referring now to the drawings, the pliers include a pair of handle members 14 that are pivotally connected together as by a rivet 15. Each handle member has a grip portion 16 on one side of the pivot connection and an extension portion 17 on the other side thereof. The handle grip portions are normally biased apart as shown in FIG. 1 by a torsion spring 18 the ends of which are secured to the handle members by screws 20.

A pair of coacting jaw members 21 and 22 are connected to the handle extension portions 17 by shouldered screws 24, FIGS. 1 and 11. The left hand jaw 21 has a vertical leg 25 and a horizontal leg 26, and the right hand jaw 22 has vertical and horizontal legs 27,28, respectively. As best shown in FIGS. 4–7, the horizontal legs of the jaws are machined to about half thickness to form undercuts 30 and 31, the undercut 30 being on the opposite side of its jaw from the undercut 31 as shown in FIGS. 5 and 7.

The jaws 21 and 22 are mounted on the handle extension portions 17 so that the inside edges of their vertical legs normally abut one another, FIG. 1, and their horizontal legs are in overlapping engagement. Thus, leg 26 of jaw 21 lies in the undercut 31 of jaw 22, see FIG. 2, and vice versa. The horizontal legs 26 and 28 of the jaws are respectively formed with holes 32,33 and slots 35,36. The left hand screw 24, FIGS. 1 and 11, passes through hole 32 in jaw 21 and slot 36 in jaw 22, and the right hand screw 24 passes through the slot 35 in jaw 21 and hole 33 in jaw 22.

With the above-described arrangement, when the handle grip portions 16 are squeezed together the extension portions 17 and jaws 21,22 move apart as shown in FIG. 8. During such movement, the vertical legs of the jaws remain parallel to each other due to the interengagement of the horizontal legs and the fact that jaw 21 can rotate a few degrees in the clockwise direction and jaw 22 can rotate similarly in the counterclockwise direction. The rotational movement can occur because each jaw can turn freely on the shoulder of the screw 24 passing through the hole in its horizontal leg and there is a free fit between the screw shoulders and the slots 35,36.

Projecting outwardly from the vertical leg of each jaw 21,22 is a pin 37, the pins being mounted in a pair of parallel holes 38 and held therein as by set screws 40. These pins are adapted to be received in the holes that are normally found in the ends of conventional snap rings, and after the pins have been inserted in the holes of a ring squeezing the handle grip portions together, FIG. 8, will operate to expand the ring so that it can be slipped along a shaft for insertion in or extraction from a shaft groove.

The pin holes 38 are intersected by a second pair of parallel holes 41, the axes of the another. pairs of holes being perpendicular to one anotherr. This enables pins 37 to be removed from the holes 38 and placed in the holes 41 so that they project from the sides of the vertical legs of the jaws rather than from the ends thereof, see FIG. 10. The same pair of set screws 40 serves to hold the pins in either pair of holes. With this construction, the pliers can be either parallel or perpendicular to the plane of the snap ring as the available space in a particular installation may dictate.

FIG. 9 illustrates a modification of the invention wherein the jaws 21′ and 22′ are constructed so that squeezing the handle grip portions together operates to move the jaws together rather than apart. with this arrangement, the pins 37 in engagement with a snap ring operate to contract the ring to enable it to be inserted in or removed from an internal location such as a groove in a bore. Jaws 21′,22′ are identical to previously described jaws 21,22 except that the hole and slot locations are reversed in each jaw. Thus, in jaw 21′, hole 42 is on the right and slot 43 is on the left whereby movement of the right hand extension portion 17 clockwise pulls jaw 21′ toward the plier centerline. In jaw 22′, hole 44 is on the left and slot 45 on the right whereby counterclockwise movement of the left hand extension portion 17 pulls jaw 22′ towards the centerline.

From the foregoing description it will be apparent that the invention provides improved parallel action pliers, the pliers being versatile and yet having a simplified construction. As will be understood by those familiar with the art, the invention may be embodied in other specific forms without departing from the spirit or essential characteristics thereof.

We claim:

1. Parallel action pliers comprising a pair of handle members having a pivotal connection between the opposite ends thereof, a pair of unitary L-shaped jaw members connected to the ends of the handle members on one side of the pivotal connection, each of said jaw members having a normally vertical leg and a normally horizontal leg, the jaw members being disposed so that the vertical legs thereof are in confronting relation to one another and the horizontal legs overlap one another, the horizontal leg of each jaw being reduced in thickness to form an undercut in which the horizontal leg of the other jaw member lies, each jaw member having a fixed connection with one of the handle members and a sliding connection with the other whereby movement of the handle members operates to open or close the jaw members, and a pin element projecting from each jaw member for engagement with a machine element to be manipulated by the pliers.

2. Pliers as defined in claim 1 wherein the ends of the handle members on the other side of the pivotal connection from the jaw members are normally spaced apart and moving said ends toward one another operates to open the jaw members.

3. Pliers as defined in claim 1 wherein the ends of the handle member on the other side of the pivotal connection from the jaw members are normally spaced apart and moving said ends toward one another operates to close the jaw members.

4. Pliers as defined in claim 1 wherein the jaw members include two pairs of parallel mounting holes for the pin elements and the latter can be selectively mounted in either pair, the axes of one pair of holes being perpendicular to the axes of the other pair.

5. Pliers as defined in claim 2 wherein the normally spaced apart ends of the handle members are biased apart by a torsion spring.

6. Parallel action snap ring pliers comprising a pair of handle members having a pivotal connection therebetween, each handle member having a gripping portion on one side of the pivotal connection and an extension portion on the other, spring means connected to the handle members and operable to bias the gripping portions of the members apart and the extension portions thereof together, a pair of unitary L-shaped jaw members connected to the extension portions of the handle members, each of said jaw portions having a normally vertical leg and a normally horizontal leg, the jaw members being diposed so that their vertical legs are in confronting relation to one another and their horizontal legs overlap one another, the horizontal leg of each jaw member being reduced in thickness to form an undercut in which the horizontal leg of the other jaw member lies, each jaw member having a fixed connection with one of the handle members and a pin and slot connection with the other whereby movement of the handle members operates to open or close the jaw members, and pin elements releasably secured to the jaw members and projecting outwardly therefrom in parallel relation to one another for engagement with a snap ring.

7. Pliers as defined in claim 6 wherein moving the normally spaced gripping portions of the handle members toward one another operates to open the jaw members.

8. Pliers as defined in claim 6 wherein moving the normally spaced gripping portions of the handle members toward one another operates to close the jaw members.

9. Pliers as defined in claim 6 wherein the pin elements can be secured in either of two pairs of parallel holes in the jaw members, the axes of one pair of holes being perpendicular to the axes of the other pair.

* * * * *

UNITED STATES PATENT AND TRADEMARK OFFICE

CERTIFICATE OF CORRECTION

PATENT NO. : 3,990,137

DATED : November 9, 1976

INVENTOR(S) : STEPHEN KULBA and LESLIE E. JOHNSON

It is certified that error appears in the above-identified patent and that said Letters Patent are hereby corrected as shown below:

Col. 2, line 57, "another." should be -- two --.

Signed and Sealed this

Fifteenth Day of February 1977

[SEAL]

*Attest:*

RUTH C. MASON
*Attesting Officer*

C. MARSHALL DANN
*Commissioner of Patents and Trademarks*